(12) United States Patent
Gomez et al.

(10) Patent No.: US 7,526,552 B2
(45) Date of Patent: Apr. 28, 2009

(54) STABLE, MINIMAL SKEW RESOURCE FLOW CONTROL TECHNIQUE IN LARGE SCALE ENTERPRISE STORAGE SYSTEMS

(75) Inventors: Juan C. Gomez, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 11/211,793

(22) Filed: Aug. 25, 2005

(65) Prior Publication Data
US 2007/0050504 A1   Mar. 1, 2007

(51) Int. Cl.
*G06F 15/173* (2006.01)
*G06F 15/16* (2006.01)

(52) U.S. Cl. .................... 709/226; 709/223; 709/233
(58) Field of Classification Search ................ 709/223, 709/226; 370/231–233, 235, 236
See application file for complete search history.

(56) References Cited

U.S. PATENT DOCUMENTS

| | | | |
|---|---|---|---|
| 6,002,667 A | | 12/1999 | Manning et al. |
| 6,078,953 A | * | 6/2000 | Vaid et al. .................... 709/223 |
| 6,751,663 B1 | | 6/2004 | Farrell et al. |
| 2003/0117958 A1 | | 6/2003 | Nation et al. |
| 2005/0135252 A1 | * | 6/2005 | Singh et al. .................. 370/236 |
| 2006/0031519 A1 | * | 2/2006 | Helliwell et al. ............ 709/227 |

OTHER PUBLICATIONS

Uttamchandani, et al., "DecisionQoS: An Adaptive, Self-Evolving QoS Arbitration Module for Storage Systems", IEEE Computer Society, 2004, 10 pages total.
Guo, et al., "Backlog Balancing Flow Control in High-Speed Data Networks", IEEE, 1995, pp. 690-695.

* cited by examiner

*Primary Examiner*—Ario Etienne
*Assistant Examiner*—Hee Soo Kim
(74) *Attorney, Agent, or Firm*—Gibb I.P. Law Firm, LLC (57) ABSTRACT

A system and method of conducting resource flow control sessions in a computer network comprises sending a resource request from a client computer to a server computer; assigning to the client computer a flow control window, wherein a size of a flow control window is based on resources available to the server computer and a level of activity of a corresponding client computer, wherein the server computer is in any of a busy and idle state of activity; determining whether to change the size of the flow control window upon receiving the resource request based on the level of activity of the corresponding client computer and a current utilization of resources during a particular session of use; tracking a number of active sessions of use of the resources in a predetermined time window; and maintaining the flow control window with a maximum queue size per number of sessions value.

20 Claims, 5 Drawing Sheets

STABLE, MINIMAL SKEW RESOURCE FLOW CONTROL TECHNIQUE IN LARGE SCALE ENTERPRISE STORAGE SYSTEMS

BACKGROUND

1. Field of the Invention

The embodiments of the invention generally relate to control systems and, more particularly, to flow control management of storage systems.

2. Description of the Related Art

The growing use of Storage Area Networks (SANs) has led to the flow of data between host servers and the storage subsystems, using protocols such as iSCSI, FCP, Infiband, etc. This trend has been taken one step further by virtualization engines and SAN file-systems that hide the details of the underlying infrastructure. Within a SAN file-system, the client sends meta-requests to the meta-data server, while the data is accessed directly from the logical unit numbers (LUNs) (connected via iSCSI or FCP). In both the above scenarios, namely (1) host server and storage subsystem interaction; and (2) the client and meta-data server interaction, the flow is related by protocols that provide reliability and in-order guarantees. In addition, these protocols also provide resource flow management such that the senders are dynamically allocated bandwidth proportional to their workload characteristics and hardware processing capabilities. The two scenarios are generically referred to as the initiator-target interaction.

There are two general goals of storage resource flow management, which is semantically also similar to network resource flow management: (1) fairly distribute storage resources among all initiators accessing the targets; and (2) avoid under-utilization of storage resources so that initiators can extract the maximum performance out of the storage subsystem. Though the goals are similar, the problem domain of storage resource flow management and traditional network resource flow management are different, and hence traditional network resource management methodologies are not directly applicable. Table 1 enumerates the differences between storage protocols and network protocols.

TABLE 1

Storage and Network Protocol Differences

| Storage Protocol (e.g. SAN.FS, iSCSI) | Network Protocols (e.g. TCP/IP) |
| --- | --- |
| One-to-many | One-to-one |
| Exact | Inexact |
| Multiple resources | Single resources |
| Application-aware | Network-aware |

First, the storage resource management problem addresses the wider domain of resource management between many storage host server clients and a storage subsystem serving these clients. By contrast, network flow resource management is concerned with just two networking peers. Second, the storage flow resource management has an exact notion of the various types of resources under its control. On the other hand, the network flow resource management does not attempt to quantify the resource utilization in the network and treats it as one indivisible type. Finally, the storage flow resource management is application-aware as it is closer to the application stack whereas the network flow resource management is more network-aware.

There are existing storage resource flow management methodologies. A few of these methodologies are aware of the storage-level semantics and provide an integrated approach to resource flow management at the storage subsystem, using the resource indicators in the target (free_tasks) to provide primary input the management decisions. However, these approaches generally do not perform in a predictable fashion in real-world environments that have a large number of initiators, and the underlying interconnection is relatively uncertain. In real-world environments, these conventional approaches generally do not scale, constantly fluctuate, are unfair in resource distribution, and tend to lead to huge number of initiator retries. In particular, the general limitations of the existing approach are enumerated as follows:

a) The flow control window dedicated to each initiator may oscillate periodically creating relatively long periods of idleness at the target which may affect throughput negatively. At times these oscillations may become synchronized creating significant negative impact on throughput.

b) At times, the algorithm may get locked into a state where throughput is distributed unfairly among the several initiators. Different initiators may get throughput that are different by at least one order of magnitude.

c) The flow control window given to each initiator may fluctuate widely even under uniform load from multiple initiators leading to reduced aggregate throughput.

d) At times, some initiators may be given a flow control window which is too small for extended periods of time resulting in initiators bring disconnected and intermittent application failures.

Conventional storage flow resource management techniques can generally be categorized into two areas: file-based and block-based storage networking. File-based storage networking is based on file access protocols such as NFS (Network File System) or CIFS (Common Internet File System). However, NFS and CIFS generally do not have any form of flow control or resource management. Direct Access File System (DAFS) provides a mechanism to throttle requests from clients but is not based on command windowing; hence its usefulness is generally limited.

Block-based storage networking is based on SCSI (small computer system interface) transport protocols such as Fibre Channel and iSCSI. Fibre Channel has a rudimentary flow resource management mechanism that is static and pessimistic and is unlikely to achieve maximum resource utilization. The iSCSI protocol has provisions for command windows that are ideal for such a storage-aware flow resource management algorithm.

Some conventional solutions provide a clustered virtualization gateway that implements its own storage flow resource management. MSCP (mass storage control protocol) is a storage transport protocol used to connect computers and storage over a bus. MSCP has a credit-based load balancing mechanism for resource management with both static and dynamic policies. However, the conventional solutions generally do not guarantee predictable performance or employ control theory ideas to improve flow control. Therefore, there remains a need for a novel resource flow control technique capable of overcoming the limitations of the conventional techniques.

SUMMARY

In view of the foregoing, the embodiments of the invention provide a method of conducting resource flow control sessions in a computer network, and a program storage device readable by computer, tangibly embodying a program of instructions executable by the computer to perform a method of conducting resource flow control sessions in a computer network, wherein the method comprises sending a resource request from at least one client computer to a server computer; assigning to each client computer a flow control window, wherein a size of a particular flow control window is based on resources available to the server computer and a level of activity of a corresponding client computer, and wherein the server computer is in any of a busy and idle state of activity; determining whether to change the size of the particular flow control window upon receiving the resource request based on the level of activity of the corresponding client computer and a current utilization of resources during a particular session of use; tracking a number of active sessions of use of the resources in a predetermined time window; and maintaining each flow control window with a maximum queue size per number of sessions value. Preferably, the client computer sends the resource request to the server computer through a network transport protocol.

Preferably, an aggregate size of all flow control windows assigned by the server computer matches queue sizes of disk controller adapters connected to the server computer. The method may further comprise the server computer keeping a session record for each client computer, wherein the session record comprises a field to track the flow control window assigned to a corresponding client computer. Additionally, the busy state of activity of the server computer preferably indicates that all resources in the server computer are currently being used such that the client computers refrain from sending additional resource requests until the server computer switches to an idle state of activity. Furthermore, for the particular session of use, the method may further comprise maintaining a current flow control window size for the corresponding client computer; maintaining a number of outstanding requests queued in the disk controller adapters; and maintaining a flag that indicates whether the particular session of use is active. Also, the particular session of use is preferably permitted to increase the size of the flow control window over the maximum queue size per number of sessions value when other sessions of use are under-utilizing resources available for use. Moreover, when only a single session of use is active, the method preferably dedicates all available resources to the single session of use. The method may further comprise tracking a maximum number of commands that can be queued at the disk controller adapters at any given time.

Another embodiment of the invention provides a system for conducting resource flow control sessions in a computer network, wherein the system comprises means for sending a resource request from at least one client computer to a server computer; means for assigning to each client computer a flow control window, wherein a size of a particular flow control window is based on resources available to the server computer and a level of activity of a corresponding client computer, and wherein the server computer is in any of a busy and idle state of activity; means for determining whether to change the size of the particular flow control window upon receiving the resource request based on the level of activity of the corresponding client computer and a current utilization of resources during a particular session of use; means for tracking a number of active sessions of use of the resources in a predetermined time window; and means for maintaining each flow control window with a maximum queue size per number of sessions value.

Another aspect of the invention provides a system for conducting resource flow control sessions in a computer network, wherein the system comprises at least one client computer adapted to send a resource request in the computer network; and a server computer connected to the at least one client computer and adapted to receive the resource request from the client computer; assign to each client computer a flow control window, wherein a size of a particular flow control window is based on resources available to the server computer and a level of activity of a corresponding client computer, and wherein the server computer is in any of a busy and idle state of activity; determine whether to change the size of the particular flow control window upon receiving the resource request based on the level of activity of the corresponding client computer and a current utilization of resources during a particular session of use; track a number of active sessions of use of the resources in a predetermined time window; and maintain each flow control window with a maximum queue size per number of sessions value.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Referring now to the drawings and more particularly to FIGS. 1 through 5 where similar reference characters denote corresponding features consistently throughout the figures, there are shown preferred embodiments of the invention. The embodiments of the invention provide a resource flow control technique referred to as "ResourceMagic", which minimizes oscillations between equilibrium regions and maximizes the rate at which the system converges to the equilibrium region.

The embodiments of the invention use a control loop to dynamically and efficiently update the flow control window provided to each initiator. The error input to the control loop is the difference between the current flow-control window assigned to an initiator and what is actually being utilized by the corresponding initiator. The outputs to the control system are new values of the flow control window for each initiator. In a preferred implementation, a modified version of the multiplicative decrease/additive increase technique used by TCP/IP (transmission control protocol/internet protocol) in which the state of multiple sessions ending in a single point can be used to adapt flow control windows for each session in a responsive, optimal, and fair manner. The embodiments of the invention introduce the concept of active sessions as opposed to total sessions used in conventional solutions. The embodiments of the invention also enhance the actions taken when resources at the server or target are how in an attempt to reward those flows that utilize their assigned resources and penalize those flows that do not use them.

Though the embodiments of the invention described herein are presented in the context of iSCSI, the embodiments of the invention are applicable to multiple scenarios, such as SAN.FS, iSCSI, etc. (i.e., in scenarios where SAN.FS metadata servers are very busy, they may benefit from using the flow control techniques provided by the embodiments of the invention to throttle SAN.FS clients fairly and efficiently).

Even when TCP can provide dynamic flow control that works well in various situations, the algorithm used by it generally fails to exploit a feature that may yield improved performance, stability, and fairness. In TCP, multiple connections sharing the same resources (i.e., network bandwidth) usually end at different points; hence the sharing state between the various connections to arrive to an optimal steady state is costly. Typically, this sharing of the distributed state is not feasible as it would involve sending extra messages among the various endpoints. Even if the state of the various connections is shared, by the time a new flow control allocation is implemented, the state that motivated it may be long gone and the collective flow control state may not be optimal. In the specific problem of iSCSI targets (and other networked storage systems), all flows end in a single node (i.e., time server or target), whereby the embodiments of the invention can be exploited towards making optimal collective decisions as to what concerns flow control.

The embodiments of the invention are based on an approach of additive increase and multiplicative decrease methodologies used in TCP/IP. A preferred embodiment of the invention also includes handling for special cases where the rules of the TCP/IP methodology are superseded by other actions based on the collective state of the various flows.

Figure 1:
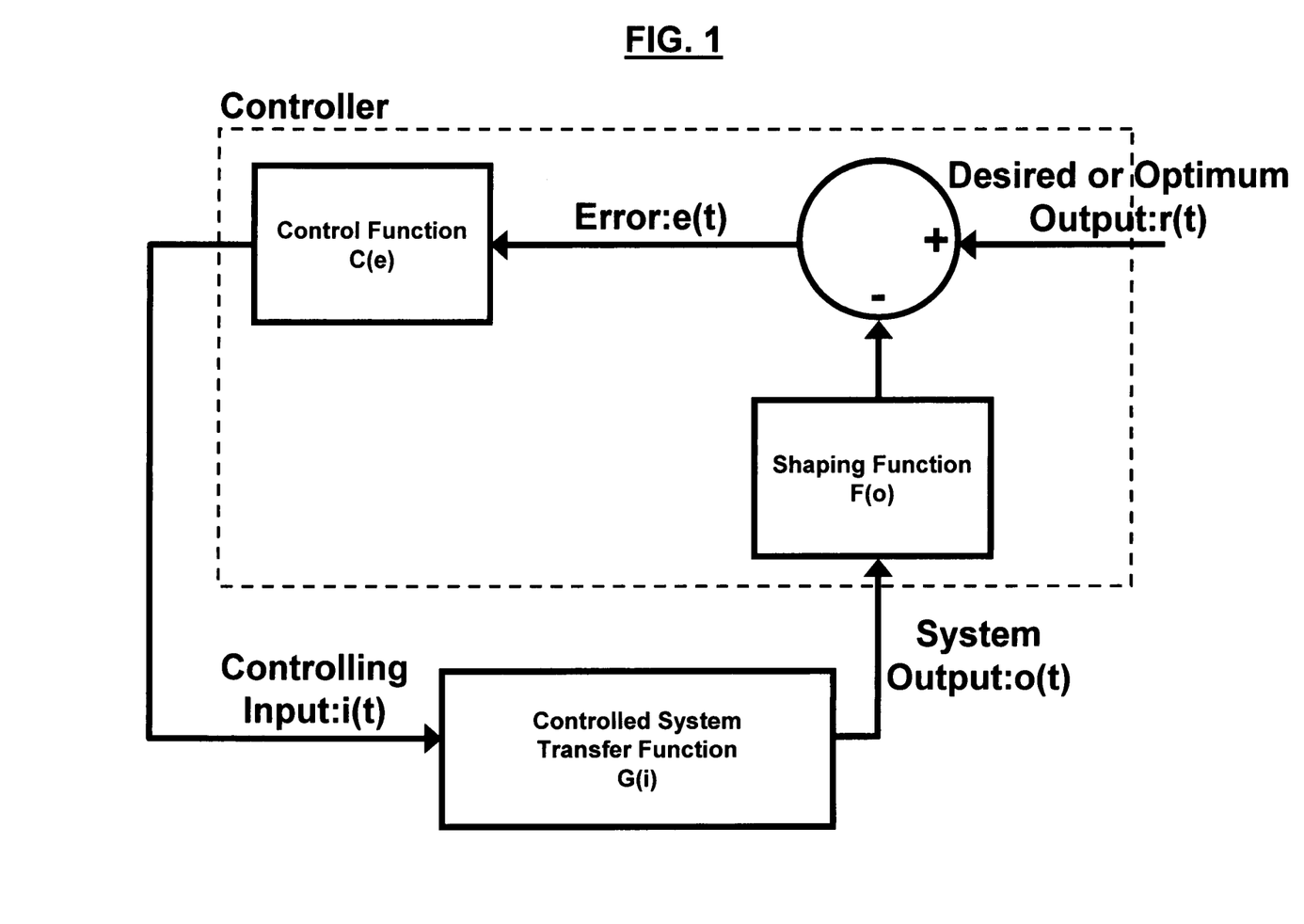
FIG. 1 illustrates an example of a control system block diagram.

In the control system example depicted in FIG. 1, the output (i.e., o(t)) of a system is compared against a desired or optimal value (i.e., r(t)) and their difference computed to generate an error measurement (i.e., e(t)). A function of the error is then used as input to the system (i.e., i(t)) in order to push its output to a desired or optimal value. Control systems are classified as linear, derivative, integral or hybrid depending on the type of function (i.e., C(e)) applied to the error before it is fed back into the system.

Simple, well-known examples of control systems include a water tank with a floating system and cruise control installed in most modem vehicles. In the water tank the desired output is a full tank and the floating systems provide a measure of the difference between the current level of water and the full mark for the tank. The error measure is converted (by the floating system) into a signal that lets more or less water into the tank depending on whether the tank is empty or close to full, respectively. Cruise control is another simple example of a control system where the controlled system is vehicle speed: the user provides an ideal speed and the cruise control system injects more or less gas depending on whether the current speed of the car deviates from the desired speed.

The embodiments of the invention uses control techniques to provide efficient, fair, and dynamic flow control for computer storage systems. According to the embodiments of the invention, each initiator is periodically assigned a flow control window size (i.e., fc_window) by the server; the related initiator may or may not use the resources provided via this flow control window. At any given time, an initiator will be using a portion of its outstanding flow control window given by the number of outstanding commands for the initiator at any given time (i.e., outstanding_requests). The embodiments of the invention utilize the difference between fc_window and outstanding requests (i.e., fc_window-outstanding_requests) as an error measurement in the control loop. Such an error measurement can be used in adapting future values of the flow control window size assigned to an initiator as to best satisfy the initiator needs and best utilize and distribute the server resources among various active initiators.

Preferably, it is desirable to decrease the difference between fc_window and outstanding requests by decreasing fc_window when outstanding_requests is smaller and increase it when outstanding_requests is equal or greater than fc_window. Such decisions may be possible if the server has infinite resources. However, in real-world applications computer servers have limited resources to be shared among multiple initiators. In considering such limitations, the embodiments of the invention provide a control function (i.e., C(e)) which is biased by the global state of the server. In other words, the resources allocated to the clients are dependent on the total number of clients sharing the resources; i.e., the average utilization of the system. Among the parameters that could be considered as part of the global state of the server and relevant for flow control decisions, the embodiments of the invention include the number of active initiators and the level of utilization of server resources. Ways in which this state could be used in deciding the flow control window size for each initiator may include the following parameter: servers reaching their peak utilization must not increase the flow control window size for any initiator (i.e., even if the initiator in question is fully utilizing its current flow control window); and when the server is at peak utilization, the flow control window for initiators that are using more than their allotment of resources can be reduced even if the initiator is fully utilizing its current flow control window.

Figure 2:
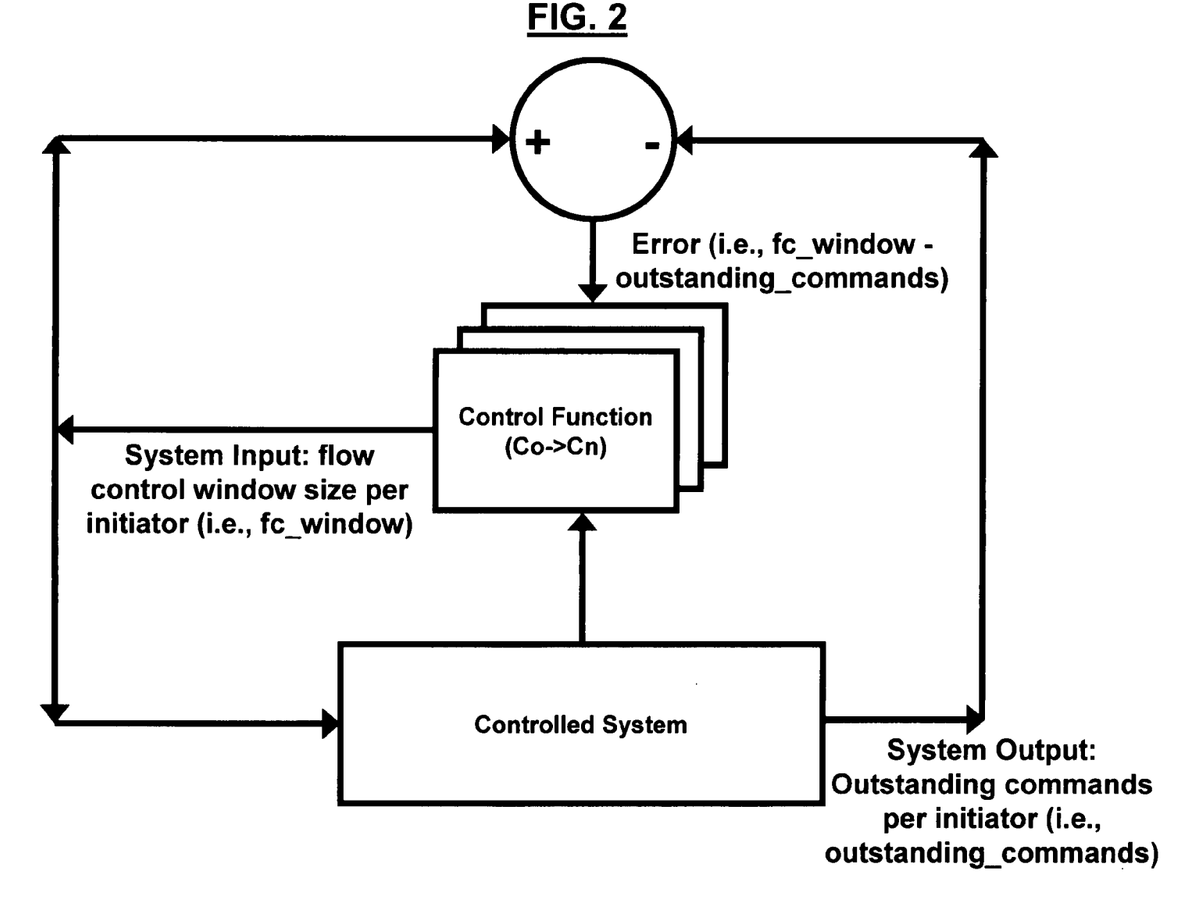
FIG. 2 illustrates a control system block diagram according to an embodiment of the invention.

FIG. 2 illustrates a block diagram of a generic flow control loop used to solve the flow control problem in the systems targeted by the embodiments of the invention. Accordingly, every initiator has a flow control loop associated with it, however for ease of understanding, FIG. 2 illustrates the initiators being collapsed all in a single set of arrows. Each control function is represented by a different box/letter (i.e., Co . . . Cn). However, in a preferred implementation these functions are the same. The box diagram of FIG. 2 represents a family of methodologies: a different methodology is created by each given set of control functions and the global state used. For the preferred implementation, Co=Cn for every n (i.e., all initiators). As part of the global state used to control the flow control window size, the embodiments of the invention utilize the number of active sessions or initiators and the server total utilization. The function used in the preferred implementation is further described below.

Figure 3:
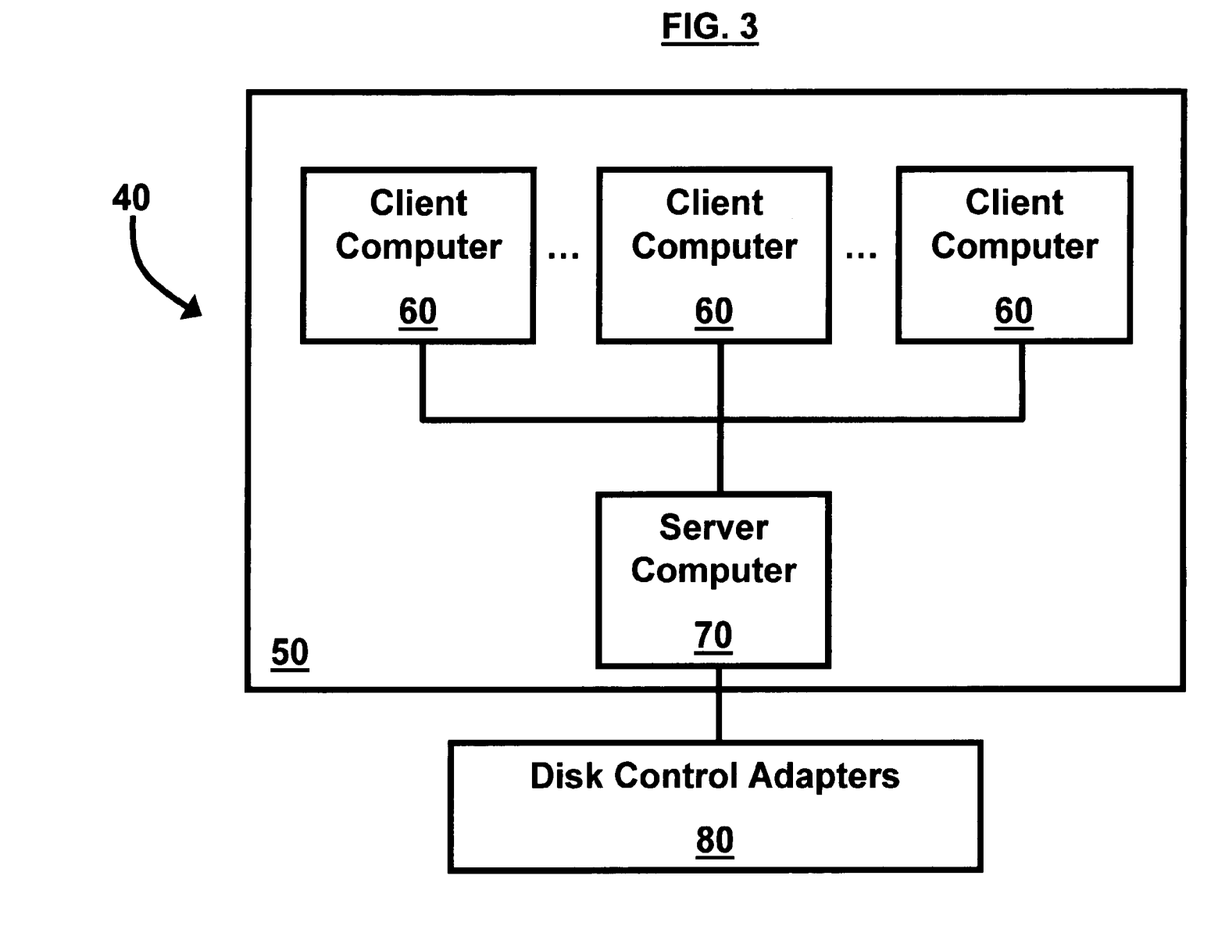
FIG. 3 illustrates a system diagram according to an embodiment of the invention.

The following description, with reference to FIG. 3, refers to two elements in the configuration provided by the embodiments of the invention: the iSCSI initiators (i.e., or clients 60) and the iSCSI target (i.e., the server 70) in a computer network 50. The clients 60 generate requests that are generally sent through a network transport protocol to the server 70. The server 70 assigns each client 60 a flow control window (not shown) taking into consideration its resources and the client level of activity. Clients 60 are expected to limit the number of simultaneous outstanding requests to their assigned flow control window and hence server resources should be fairly distributed among clients 60. The aggregate size of the flow control window (i.e., the sum of the sizes of all the client's flow control windows at any given time) at the server 70 is generally selected as to match queue sizes of backend resources (i.e., disk controller adapters 80).

The target or server side 70 keeps a session record for each initiator or client 60. This session record includes, among others things, a field to track the flow control window assigned to the corresponding client 60. According to the embodiments of the invention, the server 70 can be in one of two states: BUSY or IDLE. Being in the BUSY state indicates that all resources at the server side 70 are currently being used (i.e., queues of all the backend disk adapters 80 are currently filled) and hence clients 70 must back off so that the system 40 can come back to a state where resources are available to handle new incoming requests. While in the IDLE state, the server 70 has enough resources to handle new requests. While in this state, sessions that display activity must be given a wider flow control window when they get to fully use their current flow control window.

Upon processing each new incoming request at the server 70, the flow control methodology provided by the embodiments of the invention makes the decision as to whether to increase, decrease, or maintain the flow control window for the session in question based on the state of the server 70 and the current utilization of the session. For each session, the embodiments of the invention maintain three state items: current flow control window size (i.e., fc_window), number of outstanding requests (i.e., outstanding_requests) queued in the back-end storage adapters, and a flag that indicates whether the session is active (i.e., active). In addition to its state (i.e., server_mode=BUSY/IDLE), the target or server 70 maintains a dynamically updated count of sessions (i.e., sessions) and it tracks the maximum number of commands that can be queued at the backend adapters at any time (i.e., max_queue_size). The server side 70 also tracks a number of active sessions (i.e., active_sessions), which reflects the number of sessions which have had activity during a given time window (for example, 1 second).

In the case where all sessions are fully active, the embodiments of the invention maintain each flow control window to its ideal value of max_queue_size/sessions. A given session is allowed to grow its flow control window over this value if other sessions are not fully utilizing their fair share of resources. If only a single session is active, all resources are dedicated to it (i.e., fc_window=max_queue_size). The part of flow control that updates the window for a given session is only activated for a given session as a request is received from a given session. For this reason, the flow control window for each session is never decreased below two as to enable the client or initiator to trigger flow control adaptations at the server or target 70.

The embodiments of the invention, which is triggered every time a request is received through a given session, can be briefly described in the pseudo-code as follows:

```
if (this_session->active == 0) {
        // Count the session as active if it is currently receiving commands
            active_sessions++;
        this_session->active++;
}
if (server_mode == IDLE)
{
        //
        // Server is in the IDLE mode, which means it has resources to serve new
        // requests per session.
        //
        // Before we grant an active session a wider flow control window we make
        // sure it is currently fully utilizing its resources.
        if (this_session->fc window <= this_session->outstanding_requests)
        {
                // When a sessions is fully utilizing its resources and the server has
                // more resources to dedicate to it we provide them to the session in
                // increments of one (i.e. additive increase).
                this_session->fc window =\
                        min((this_session->fc window + 1), max_tasks);
        } else {
        // If the server is in the idle state but the session for which a request has
        // been received is not filly utilizing the resources currently assigned to it
        // we take no action.
                nop( ); // No operation
        }
}
else    // server_mode = BUSY
{
        //
        // Server is in the BUSY mode, which means it has resources to serve new
        // requests are scarce or unavailable.
        //
    If (this_session>fc_window> (max _tasks/active_sessions)){
    // The current session has more than its fair share so it must give some
        // back.
        if (this_session->fc_window> 1){
```

```
            // If the current window is not too small, try to give half to
            // other sessions (i.e. multiplicative decrease).
                This_session->fc_window = this_session->fc_window / 2;
        }
    } else if (this_session->fc_window < (max_tasks/active_sessions)) {
        if (this_session->fc window <= this_session->outstanding_cmds)) {
            // The current session has too little and it is indeed using it,
            // take one.
                this_session->fc_window = min((this_session->fc_window + 1),
                                              max_tasks/active sessions);
        } else {
            // The current session has too little and it is not using it,
            // give one back.
            this_session->fc_window--;
        }
    } else if ((this_session->fc_window == (max_tasks/active_sessions)) \
        &&\
        (this_session->fc_window> this_session->outstanding_cmds)){
        // Current session has its share so it can give something up but not if we
        // have too little.
        if (this_session->fc_window> 2)
            this_session->fc_window--;
        }
    }
```

The embodiments of the invention account for the scenario in which even when the server 70 may be in a BUSY state, a session may not be fully utilizing its resources and may need to be given a smaller window. The embodiments of the invention also account for the scenario in which the server 70 is in the BUSY state, the session receiving a command may, in fact, be fully utilizing its resources and may have less than its fair share of resources; hence requiring a flow control window increase. In order to keep track of the number of active sessions, the embodiments of the invention have a timer thread run across the list of sessions and clear the active field periodically, thereby reducing the total number of active sessions each time the active field of a session is set to zero.

Figure 4:
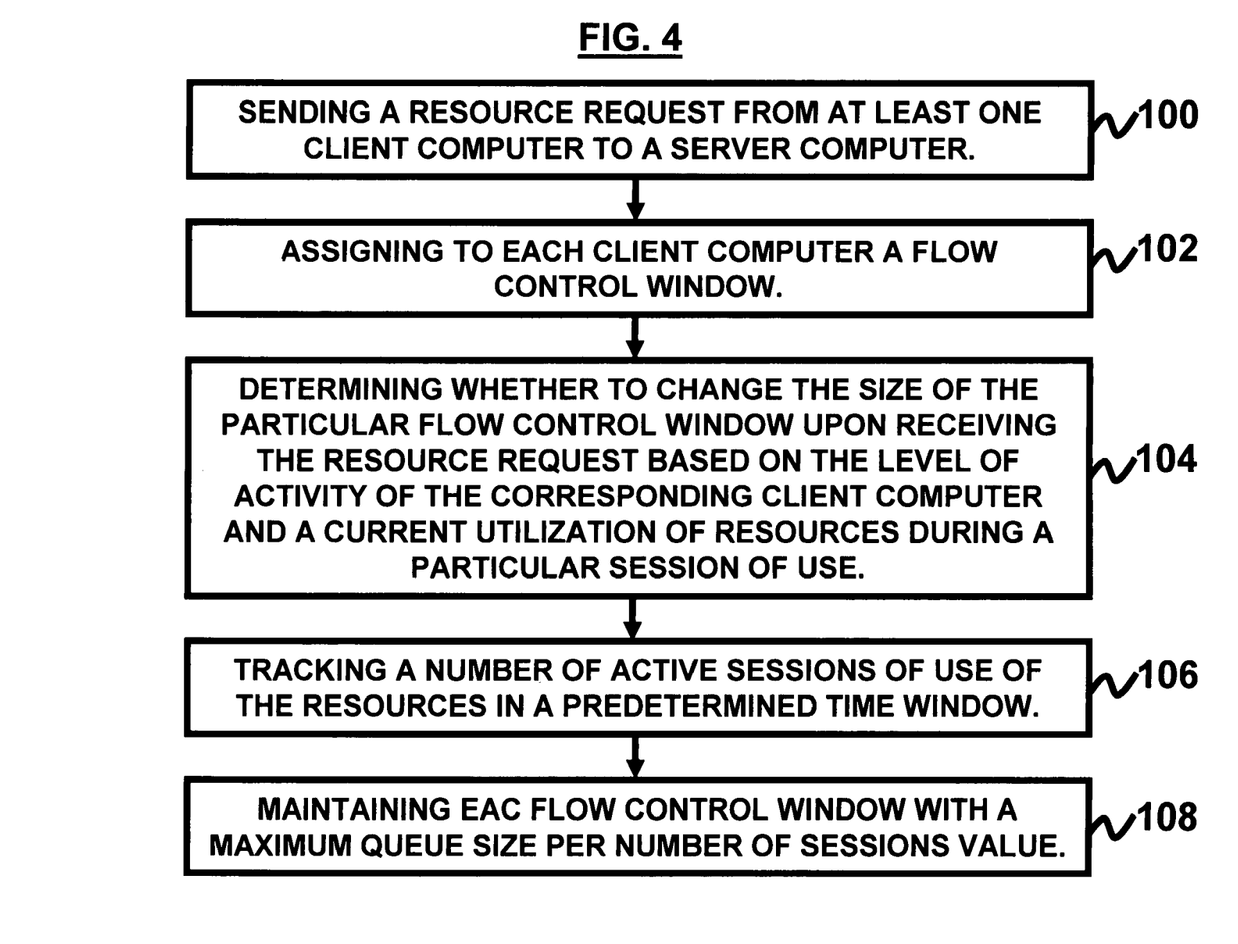
FIG. 4 illustrates a flow diagram of a preferred method according to an embodiment of the invention.

FIG. 4 (with reference to FIGS. 1 through 3) illustrates a flow diagram of a preferred method of conducting resource flow control sessions in a computer network, wherein the method comprises sending (100) a resource request from at least one client computer 60 to a server computer 70; assigning (102) to each client computer 60 a flow control window, wherein a size of a particular flow control window (not shown) is based on resources available to the server computer 70 and a level of activity of a corresponding client computer 60, and wherein the server computer 70 is in any of a busy and idle state of activity; determining (104) whether to change the size of the particular flow control window upon receiving the resource request based on the level of activity of the corresponding client computer 60 and a current utilization of resources during a particular session of use; tracking (106) a number of active sessions of use of the resources in a predetermined time window; and maintaining (108) each flow control window with a maximum queue size per number of sessions value. Preferably, the client computer 60 sends the resource request to the server computer 70 through a network transport protocol.

Preferably, an aggregate size of all flow control windows assigned by the server computer 70 matches queue sizes of disk controller adapters 80 connected to the server computer 70. The method may further comprise the server computer 70 keeping a session record for each client computer 60, wherein the session record comprises a field to track the flow control window assigned to a corresponding client computer 60. Additionally, the busy state of activity of the server computer 70 preferably indicates that all resources in the server computer 70 are currently being used such that the client computers 60 refrain from sending additional resource requests until the server computer 70 switches to an idle state of activity. Furthermore, for the particular session of use, the method may further comprise maintaining a current flow control window size for the corresponding client computer 60; maintaining a number of outstanding requests queued in the disk controller adapters 80; and maintaining a flag (not shown) that indicates whether the particular session of use is active. Also, the particular session of use is preferably permitted to increase the size of the flow control window over the maximum queue size per number of sessions value when other sessions of use are under-utilizing resources available for use. Moreover, when only a single session of use is active, the method preferably dedicates all available resources to the single session of use. The method may further comprise tracking a maximum number of commands that can be queued at the disk controller adapters 80 at any given time.

The embodiments of the invention can take the form of an entirely hardware embodiment, an entirely software embodiment, or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
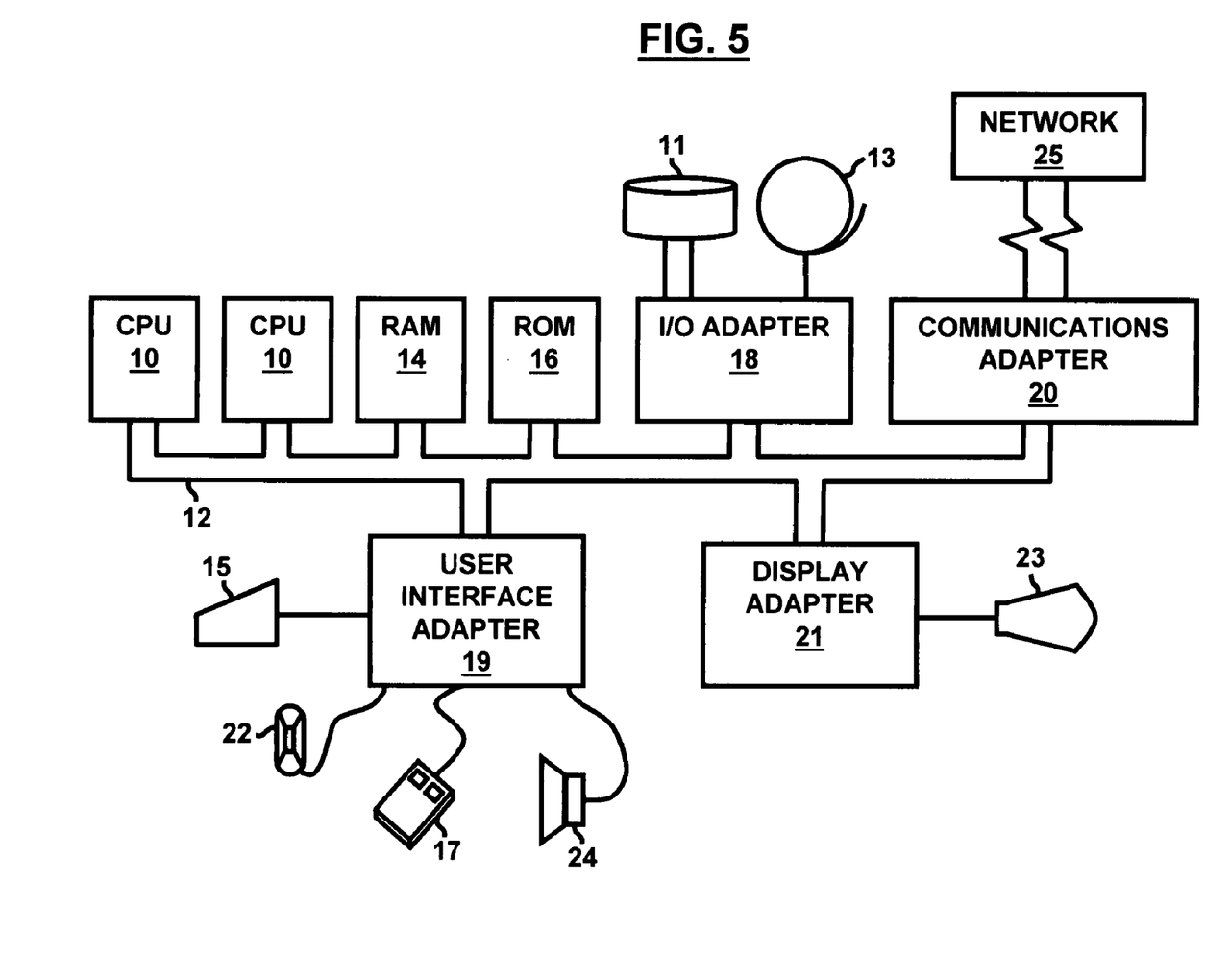
FIG. 5 illustrates a computer system diagram according to an embodiment of the invention.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments of the invention achieve the following advantages over conventional solutions: (1) the embodiments of the invention are scalable, whereby it ensures fairness and optimal utilization of resources within environments with large number of initiators; (2) the embodiments of the invention can handle fluctuations in the underlying interconnectivity. This is because of its sensitivity to per-initiator "need-based" allocation rather that the "global deficit" paradigm that is used in conventional approaches; (3) the embodiments of the invention ensure minimal skew and fast equilibrium convergence for storage resource flow management; (4) the embodiments of the invention can rapidly adapt to resource flow distributions in the event of client failures/additions and additions of resources; and (5) the embodiments of the invention use a simple control system, and can dynamically and efficiently allocate resources to multiple initiators concurrently.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of conducting resource flow control sessions in a computer network, said method comprising:
sending a resource request from at least one client computer to a server computer;
assigning to each said client computer a flow control window, wherein a size of a particular flow control window is based on resources available to said server computer and a level of activity of a corresponding client computer, and wherein said server computer is in any of a busy and idle state of activity;
determining whether to change said size of said particular flow control window upon receiving said resource request based on said level of activity of said corresponding client computer and a current utilization by said corresponding client of resources during a particular session of use;
determining an amount of said change in said size of said particular flow control window by calculating a difference between an input value of said flow control window size per client computer and an output value of outstanding resource requests per client computer, said difference comprising an error measurement of a control loop of said computer network;
tracking a number of active sessions of use of said resources in a predetermined time window; and
maintaining each said flow control window with a maximum queue size per number of sessions value, by determining a new value of said flow control window size per client computer based on said error measurement and a control function that is biased by a global state of said server computer.

2. The method of claim 1, wherein said client computer sends said resource request to said server computer through a network transport protocol.

3. The method of claim 1, wherein an aggregate size of all flow control windows assigned by said server computer matches queue sizes of disk controller adapters connected to said server computer.

4. The method of claim 1, further comprising said server computer keeping a session record for each said client computer, wherein said session record comprises a field to track said flow control window assigned to a corresponding client computer.

5. The method of claim 1, wherein said busy state of activity of said server computer indicates that all resources in said server computer are currently being used such that said client computers refrain from sending additional resource requests until said server computer switches to an idle state of activity.

6. The method of claim 3, wherein for a particular session of use, said method further comprises:
maintaining a current flow control window size for said corresponding client computer;
maintaining a number of outstanding requests queued in said disk controller adapters; and
maintaining a flag that indicates whether said particular session of use is active.

7. The method of claim 1, wherein said particular session of use is permitted to increase said size of said flow control window over said maximum queue size per number of sessions value when other sessions of use are under-utilizing resources available for use.

8. The method of claim 1, wherein when only a single session of use is active, said method further comprising dedicating all available resources to said single session of use.

9. The method of claim 3, further comprising tracking a maximum number of commands that can be queued at said disk controller adapters at any given time.

10. A program storage device readable by computer, tangibly embodying a program of instructions executable by said computer to perform a method of conducting resource flow control sessions in a computer network, said method comprising:
    sending a resource request from at least one client computer to a server computer;
    assigning to each said client computer a flow control window, wherein a size of a particular flow control window is based on resources available to said server computer and a level of activity of a corresponding client computer, and wherein said server computer is in any of a busy and idle state of activity;
    determining whether to change said size of said particular flow control window upon receiving said resource request based on said level of activity of said corresponding client computer and a current utilization by said corresponding client of resources during a particular session of use;
    determining an amount of said change in said size of said particular flow control window by calculating a difference between an input value of said flow control window size per client computer and an output value of outstanding resource requests per client computer, said difference comprising an error measurement of a control loop of said computer network;
    tracking a number of active sessions of use of said resources in a predetermined time window; and
    maintaining each said flow control window with a maximum queue size per number of sessions value, by determining a new value of said flow control window size per client computer based on said error measurement and a control function that is biased by a global state of said server computer.

11. The program storage device of claim 10, wherein in said method, said client computer sends said resource request to said server computer through a network transport protocol.

12. The program storage device of claim 10, wherein in said method, an aggregate size of all flow control windows assigned by said server computer matches queue sizes of disk controller adapters connected to said server computer.

13. The program storage device of claim 10, wherein said method further comprises said server computer keeping a session record for each said client computer, wherein said session record comprises a field to track said flow control window assigned to a corresponding client computer.

14. The program storage device of claim 10, wherein in said method, said busy state of activity of said server computer indicates that all resources in said server computer are currently being used such that said client computers refrain from sending additional resource requests until said server computer switches to an idle state of activity.

15. The program storage device of claim 12, wherein for a particular session of use, said method further comprises:
    maintaining a current flow control window size for said corresponding client computer;
    maintaining a number of outstanding requests queued in said disk controller adapters; and
    maintaining a flag that indicates whether said particular session of use is active.

16. The program storage device of claim 10, wherein in said method, said particular session of use is permitted to increase said size of said flow control window over said maximum queue size per number of sessions value when other sessions of use are under-utilizing resources available for use.

17. The program storage device of claim 10, wherein when only a single session of use is active, said method further comprises dedicating all available resources to said single session of use.

18. The program storage device of claim 12, wherein said method further comprises tracking a maximum number of commands that can be queued at said disk controller adapters at any given time.

19. A system for conducting resource flow control sessions in a computer network, said system comprising:
    means for sending a resource request from at least one client computer to a server computer;
    means for assigning to each said client computer a flow control window, wherein a size of a particular flow control window is based on resources available to said server computer and a level of activity of a corresponding client computer, and wherein said server computer is in any of a busy and idle state of activity;
    means for determining whether to change said size of said particular flow control window upon receiving said resource request based on said level of activity of said corresponding client computer and a current utilization by said corresponding client of resources during a particular session of use;
    means for determining an amount of said change in said size of said particular flow control window by calculating a difference between an input value of said flow control window size per client computer and an output value of outstanding resource requests per client computer, said difference comprising an error measurement of a control loop of said computer network;
    means for tracking a number of active sessions of use of said resources in a predetermined time window; and
    means for maintaining each said flow control window with a maximum queue size per number of sessions value, by determining a new value of said flow control window size per client computer based on said error measurement and a control function that is biased by a global state of said server computer.

20. A system for conducting resource flow control sessions in a computer network, said system comprising:
    at least one client computer adapted to send a resource request in said computer network; and
    a server computer connected to said at least one client computer and adapted to:
    receive said resource request from said client computer;
    assign to each said client computer a flow control window, wherein a size of a particular flow control window is based on resources available to said server computer and a level of activity of a corresponding client computer, and wherein said server computer is in any of a busy and idle state of activity;
    determine whether to change said size of said particular flow control window upon receiving said resource request based on said level of activity of said corresponding client computer and a current utilization by said corresponding client of resources during a particular session of use;

determining an amount of said change in said size of said particular flow control window by calculating a difference between an input value of said flow control window size per client computer and an output value of outstanding resource requests per client computer, said difference comprising an error measurement of a control loop of said computer network;

track a number of active sessions of use of said resources in a predetermined time window; and maintain each said flow control window with a maximum queue size per number of sessions value, by determining a new value of said flow control window size per client computer based on said error measurement and a control function that is biased by a global state of said server computer.

* * * * *